Oct. 30, 1934.  J. S. HULET  1,978,998
TRAP
Filed April 16, 1934

Inventor
J. S. Hulet,

By Clarence A. O'Brien
Attorney

Patented Oct. 30, 1934

1,978,998

UNITED STATES PATENT OFFICE 1,978,998

TRAP

Jesse S. Hulet, Kingman, Ariz.

Application April 16, 1934, Serial No. 720,853

2 Claims. (Cl. 43—81)

This invention relates to a trap for rodents, the general object of the invention being to so form the bait holding member that the rodent must so position itself on the trap, in order to reach the bait, that it will be caught by the spring actuated member of the trap.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

In these views, the trap, shown generally at A, is of the usual or any desired construction and the bait carrying member is shown at B and has the part 1 thereon for engaging the trigger bar 2 for holding the spring actuated member 3 in set position.

Figure 1:
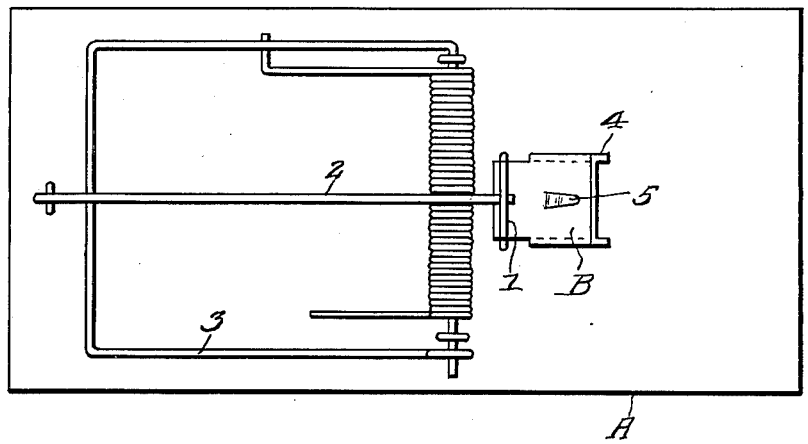
Figure 1 is a top plan view of the improved trap.
Figure 2:
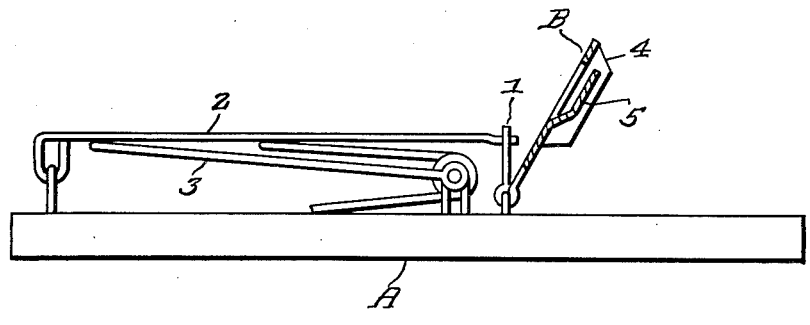
Figure 2 is a side view thereof.
Figure 3:
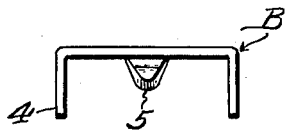
Figure 3 is an end view of the bait carrying member.

In carrying out the invention, I make the member B of plate-like form, with its side edges extended and bent downwardly to form the wings 4 and the plate-like part is cut to provide a tongue 5 which is offset downwardly, as shown in Figure 2. Thus the bait held by the tongue 5 is located between the wings 4 so that, in order to reach the bait, the animal must place itself in front of the member B where it will be struck and held by the spring actuated member 3 when the trap is sprung. Thus this invention insures the animal being caught by the trap as it cannot reach the bait until it places itself in a position where it must necessarily be struck and held by the spring actuated member 3.

The trap will be more efficient if made in a smaller size than traps now on the market and this will save material, thus enabling the improved trap to be manufactured at less cost.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. A combined bait holder and trigger for rodent traps comprising an elongated plate having a pivot receiving portion adjacent one end thereof and said end extending upwardly having a part for receiving a trigger bar, depending longitudinally extending wings connected with the side edges of the plate, said wings being of elongated form and extending from the opposite end of the plate to a point spaced outwardly from the pivot receiving portion and a bait holding member depending from the plate and located between the wings.

2. In a rodent trap of the class described including a base, a spring actuated bail and a trigger bar, a combined trigger and bait holder comprising an elongated plate having a portion adjacent one end thereof pivotally connected with the base, said end extending upwardly and provided with an opening for receiving the free end of the trigger bar, the outer portion of the plate having its side edges bent downwardly to provide elongated longitudinally extending wings and a tongue struck from the plate and offset downwardly between the wings for holding bait between the wings.

JESSE S. HULET.